(12) United States Patent
Hoelzle et al.

(10) Patent No.: US 9,665,650 B1
(45) Date of Patent: *May 30, 2017

(54) IN-CONTEXT SEARCHING

(71) Applicant: Google Inc., Mountain View, CA (US)

(72) Inventors: Urs Hoelzle, Palo Alto, CA (US);
Monika H. Henzinger, Menlo Park, CA (US); David Desjardins, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,812

(22) Filed: Aug. 14, 2015

Related U.S. Application Data (63) Continuation of application No. 14/518,708, filed on Oct. 20, 2014, now Pat. No. 9,111,000, which is a continuation of application No. 13/154,050, filed on Jun. 6, 2011, now Pat. No. 8,868,549, which is a continuation of application No. 11/869,513, filed on Oct. 9, 2007, now Pat. No. 7,962,469, which is a continuation of application No. 09/734,901, filed on Dec. 13, 2000, now Pat. No. 7,305,380.

(60) Provisional application No. 60/171,019, filed on Dec. 15, 1999.

(51) Int. Cl.
*G06F 17/30* (2006.01)
*H04L 29/08* (2006.01)

(52) U.S. Cl.
CPC .. *G06F 17/30867* (2013.01); *G06F 17/30424* (2013.01); *H04L 67/02* (2013.01)

(58) Field of Classification Search
CPC ......... G06F 17/30648; G06F 17/30864; G06F 17/30867

USPC .......................... 707/692, 723, 728, 729, 713
See application file for complete search history.

(56) References Cited

U.S. PATENT DOCUMENTS

| | | |
|---|---|---|
| 5,754,938 A | 5/1998 | Herz et al. |
| 5,802,292 A | 9/1998 | Mogul |
| 5,937,397 A | 8/1999 | Callaghan |
| 5,983,227 A | 11/1999 | Nazem et al. |
| 6,006,225 A | 12/1999 | Bowman et al. |
| 6,138,113 A | 10/2000 | Dean et al. |
| 6,226,640 B1 | 5/2001 | Ostrovsky et al. |
| 6,285,999 B1 | 9/2001 | Page |
| 6,286,006 B1 | 9/2001 | Bharat et al. |
| 6,292,796 B1 | 9/2001 | Drucker et al. |
| 6,321,220 B1 | 11/2001 | Dean et al. |
| 6,339,773 B1 | 1/2002 | Rishe |
| 6,360,215 B1 | 3/2002 | Judd et al. |
| 6,360,227 B1 | 3/2002 | Aggarwal et al. |
| 6,401,118 B1 | 6/2002 | Thomas |

(Continued)

OTHER PUBLICATIONS

Jon M. Kleinberg: "Authoritative Sources in a Hyperlinked Environment"; Technical Report RJ10076; IBM; May 1997; pp. 1-33 and Abstract.

(Continued)

*Primary Examiner* — Monica Pyo
(74) *Attorney, Agent, or Firm* — Fish & Richardson P.C.

(57) ABSTRACT

A system limits search results based on context information. The system obtains the context information and a search query, and obtains a set of references to documents in response to the search query. The system then filters the set of references based on the context information and presents the filtered set of references to a user.

20 Claims, 11 Drawing Sheets

(56) References Cited

U.S. PATENT DOCUMENTS

| | | | |
|---|---|---|---|
| 6,434,556 B1 | 8/2002 | Levin et al. | |
| 6,564,202 B1 * | 5/2003 | Schuetze | G06F 17/3061 |
| 6,567,797 B1 * | 5/2003 | Schuetze | G06F 17/3061 |
| 6,636,853 B1 | 10/2003 | Stephens, Jr. | |
| 6,681,247 B1 | 1/2004 | Payton | |
| 6,728,752 B1 * | 4/2004 | Chen | G06F 17/3025 707/999.01 |
| 7,107,227 B1 | 9/2006 | Bezos et al. | |
| 7,296,016 B1 | 11/2007 | Farach-Colton et al. | |
| 7,305,380 B1 | 12/2007 | Hoelzle et al. | |
| 7,962,469 B1 | 6/2011 | Hoelzle et al. | |
| 8,868,549 B1 | 10/2014 | Hoelzle et al. | |
| 9,111,000 B1 | 8/2015 | Hoelzle et al. | |
| 2006/0155751 A1 | 7/2006 | Geshwind et al. | |

OTHER PUBLICATIONS

Kaindl et al.: "Combining Structure Search and Content Search for the World-Wide Web"; Proceedings of the Ninth ACM Conference on Hypertext and Hypermedia; Pittsburgh, PA 1998; pp. 217-224.

Meng et al.; "Improve Web Search Accuracy Using Personalized Profile"; University of Texas-Pan America; Department of Computer Science; Jan. 1999; 10 pages.

Hansen et al.; "Using Navigation Data to Improve IR Functions in the Context of Web Search"; Proceedings of the Tenth International Conference on Information and Knowledge Management; Atlanta, Georgia, U.S.A. ACM Press 2001; pp. 135-142.

D. Koller et al.; "Hierarchically Classifying Documents Using Very Few Words"; International Conference on Machine Learning; 1997; pp. 170-178.

J. Dean et al., "Finding Related Web Pages in the World Wide Web"; Eighth International World Wide Web Conference; May 1999; pp. 389-401.

Gerald Salton, Chris Buckley: "Term Weighting Approaches in Automatic Text Retrieval," Information Processing and Management 24(5): 513-523 (1988).

S. Brin and L. Page. "The anatomy of a large-scale hypertextual web search engine," In Proceedings of the Seventh International World Wide Web Conference 1998, pp. 107-117.

Lewis, D., "Evaluating and Optimizing Autonomous Text Classification Systems," SIGIR 95: Proceedings of the Eighteenth Annual International ACM-SIGIR Conference on Research and Development in Information Retrieval, Jul. 1995, pp. 246-254.

Fitzpatrick et al.; "Automatic Feedback Using Past Queries: Social Searching?"; SIGIR 97, Philadelphia, Pa; ACM; 1997.

Diligenti et al.; "Focused Crawling Using Context Graphs"; Proceedings of the $26^{th}$ VLDB Conference; 2000; pp. 527-534;.

Kim et al.; "An Improved Computation of the PageRank Algorithm"; ECIR 2002; LNCS 2291; Springer-Verlag Berlin Heidelberg; 2002; pp. 73-85.

Pitkow et al.; Personalized Search; Communications of the ACM; vol. 45, Issue 9; Sep. 2002; pp. 50-55.

Finkelstein et al.; "Placing search in context: the concept revisited"; Proceedings of the $10^{th}$ International Conference on World Wide Web; ACM; 2001; pp. 406-414.

\* cited by examiner

FIG. 6 java.sun.com - The Source for Java(TM) Technology (Java$^{RN}$)
... Shortcuts What Is Java...? ...
Description: The one and only Sun Java site. Well, there's also the Java
Developer's Connection, but you can get...
Category: Computers > Programming > Languages > Java
java.sun.com/ - 42k - Cached - Similar pages > Java Developer Connection
> ... Welcome to the Java Developer Connection SM ! A central place for
> developers to learn about the latest Java TM technologies. ...
> java.sun.com/jdc/ - 42k - Cached - Similar pages
> [ More results from java.sun.com ]

The Java Boutique: Free Java Applets, Games, Programming ...
... for the free weekly JNews newsletter to stay informed about the latest Java
applets, industry news, and developer trends. Read All About JNews Privacy
Policy. ...
Description: The Java Boutique is a large, daily updated collection of java applets,
apps and servlets.
Category: Computers > Programming > Languages > Java > Applets > Collections
javaboutique.internet.com/ - 32k - Cached - Similar pages Home Page - Microsoft Technologies for Java
... Recent Java Developments at Microsoft. New Microsoft virtual ...
Description: The information site for Microsoft tools and technologies for Java.
(Microsoft)
Category: Computers > Programming > Languages > Java > Extensions > Java-COM
www.microsoft.com/java/default.htm - 24k - Cached - Similar pages Javascripts by Java-Scripts.net: Free javascripts, tutorials, ...
... Free Javascripts Welcome to Java-scripts.net, a great little place to find cool
and
useful JavaScripts for your site! All scripts on this site come with easy-to ...
Description: Useful scripts in several categories.
Category: Computers > Programming > Languages > JavaScript > Scripts
java-scripts.net/ - 24k - Cached - Similar pages

FIG. 7A

Yahoo Travel Destinations: Java
... Yahoo! Travel - Java, ... Java Sections. Destination Information. Book Your Trip.
... Weather. Jakarta, 72...88 F, Search. Search all of Yahoo! Travel Search only in Java. ...
travel.yahoo.com/t/Asia/Indonesia/Java/ - 11k - Cached - Similar pages Yahoo! Travel
... Maps and Views:Photos: Photos of Java - taken by Galen R. Frysinger.
Newspapers: Suara Pembaruan - mengandungi berita terkini. Surabaya Post; Jawa Pos. ...
travel.yahoo.com/t/asia/indonesia/java/travel_resources/ - 9k - Cached - Similar pages Yahoo Travel Destinations: Java Lodging
... Losmen Jalan Lapangan 10, Kalibaru (tel 0333/97700). Comfortable, well-furnished bungalows in a great garden – one of the best places in East Java. (US$35). ...
travel.yahoo.com/t/asia/indonesia/java/lodging/ - 8k - Cached - Similar pages Java
... Yahoo! Australia & NZ Travel. ... Book Online. Weather. Jakarta. Traveller's Information. Dining Restaurants, Reviews... Lodging Hotels, Resorts... ...
au.travel.yahoo.com/Destinations/Asia/Countries/Indonesia//Cities/Java/ - 5k - Cached - Similar pages Yahoo! Travel
... Yahoo! Travel - Java, ... Web Sites. Hotels: Garden Palace Hotel -; Hotel Sahid Surabaya -; Hotel Horison ...
travel.yahoo.com/t/asia/indonesia/java/lodging/hotels/ - 7k - Cached - Similar pages

IN-CONTEXT SEARCHING

RELATED APPLICATIONS

This application is a continuation of U.S. patent application Ser. No. 14/518,708, filed Oct. 20, 2014 (now U.S. Pat. No. 9,111,000), which is a continuation of U.S. patent application Ser. No. 13/154,050, filed Jun. 6, 2011 (now U.S. Pat. No. 8,868,549), which is a continuation of U.S. patent application Ser. No. 11/869,513, filed Oct. 9, 2007 (now U.S. Pat. No. 7,962,469), which is a continuation of U.S. patent application Ser. No. 09/734,901, filed Dec. 13, 2000 (now U.S. Pat. No. 7,305,380), which is a nonprovisional of U.S. Provisional Application Ser. No. 60/171,019, filed Dec. 15, 1999. The entire contents of all of the above applications are herein incorporated by reference.

BACKGROUND OF THE INVENTION

A. Field of the Invention

The present invention relates generally to information retrieval systems and, more particularly, to systems and methods for performing in-context searching.

B. Description of Related Art

Conventional techniques for searching a hypertext medium, such as the World Wide Web ("web"), are replete with deficiencies. For example, current search engines permit only keyword searching, possibly extended by features, such as restricting the answer set to a given domain or on a given host. These search engines do not, however, permit search results to be restricted to return results related to a defined set of information, such as Uniform Resource Locators (URLs).

As a result, there exists a need for a mechanism that provides search results that are related to a defined set of information, such as URLs.

SUMMARY OF THE INVENTION

Systems and methods consistent with the present invention address this and other needs by providing mechanisms for limiting results of a search query to links related to a given set of information, such as URLs. As a result, a user may be presented with more relevant search results.

In accordance with the purpose of the invention as embodied and broadly described herein, a system limits search results based on context information. The system obtains the context information and a search query, and obtains a set of references to documents in response to the search query. The system then filters the set of references based on the context information and presents the filtered set of references.

In another implementation consistent with the present invention, a web browser includes instructions for obtaining a set of addresses; instructions for obtaining one or more search terms; and instructions for generating a search query from the one or more search terms. The web browser further includes instructions for obtaining a list of references to documents based on the search query; instructions for filtering the list of references based on the set of addresses; and instructions for presenting the filtered list of references.

In yet another implementation consistent with the present invention, a method filters a list of references to documents obtained as a result of a search performed by a client. The method includes receiving context information from the client, obtaining a list of references to documents obtained as a result of a search, and identifying one or more of the references in the list of references that are related to the context information. The method further includes creating a filtered list of references using the identified references and sending the filtered list of references to the client.

In a further implementation consistent with the present invention, a server tailors a search by a client based on context information. The server obtains context information, obtains one or more search terms from the client, and generates a set of references to documents based on the one or more search terms. The server filters the set of references based on the context information and outputs the filtered set of references to the client.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7A illustrates example links with which the user might be presented;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention filter search results to return only results related to a defined set of information, such as URLs. As a result, a user is presented with more relevant links than obtained by conventional information retrieval systems.

Exemplary Network with Browser Assistant

Figure 1:
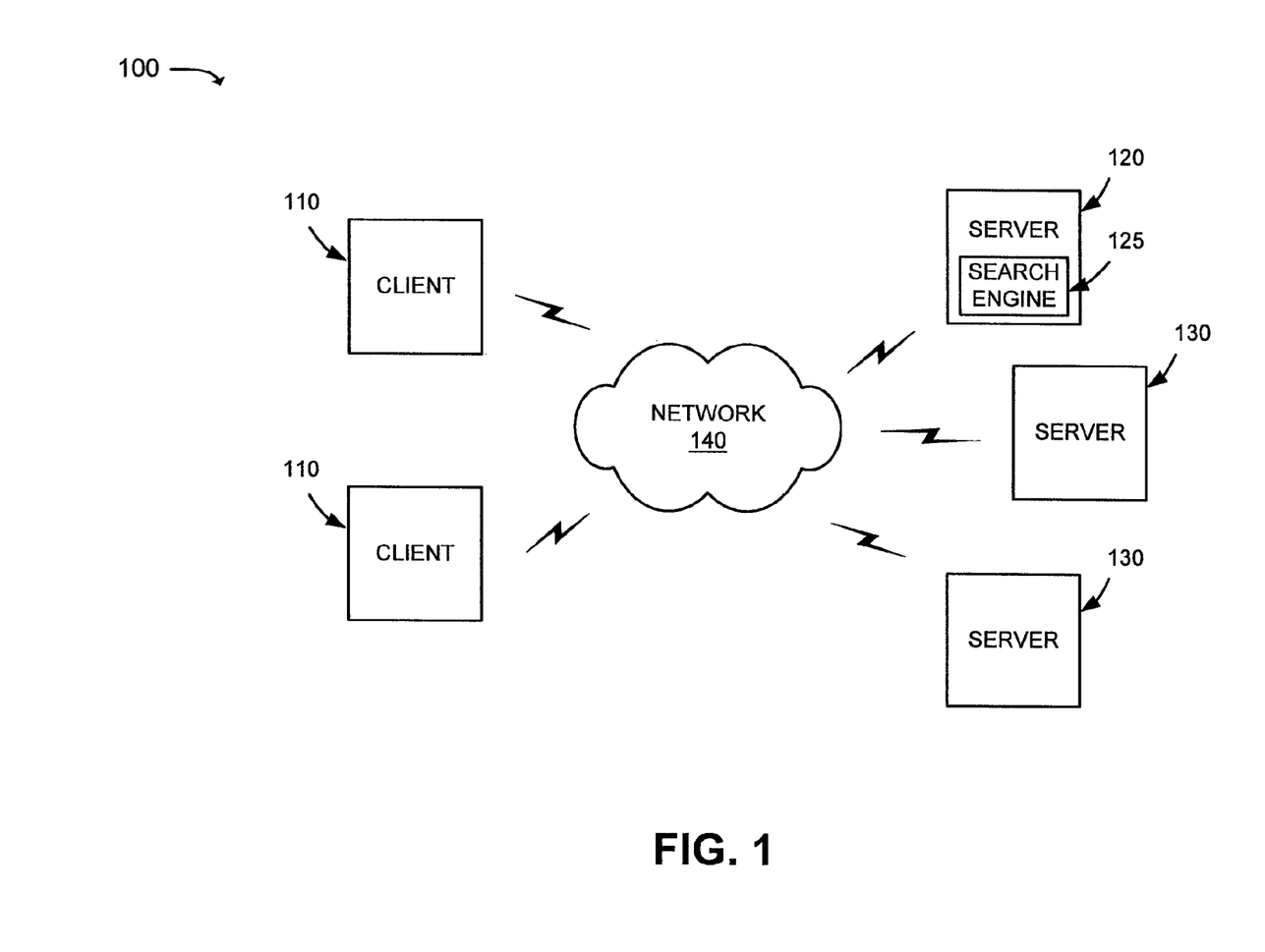
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120-130 via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120-130 have been illustrated as connected to network 140 in FIG. 1 for simplicity. In practice, there may be more or less clients and servers. Also, in some instances, a client may perform the functions of a server and a server may perform the functions of a client.

The clients 110 may include devices, such as wireless telephones, personal computers, personal digital assistants (PDAs), lap tops, etc., threads or processes running on these devices, and/or objects executable by these devices. The servers 120-130 may include server devices, threads, and/or objects that operate upon, search, or maintain documents in a manner consistent with the present invention. The clients 110 and servers 120-130 may connect to the network 140 via wired, wireless, or optical connections.

In an implementation consistent with the present invention, the server 120 may include a search engine 125 usable by the clients 110. The servers 130 may store documents accessible by the clients 110.

Exemplary Client Architecture

Figure 2:
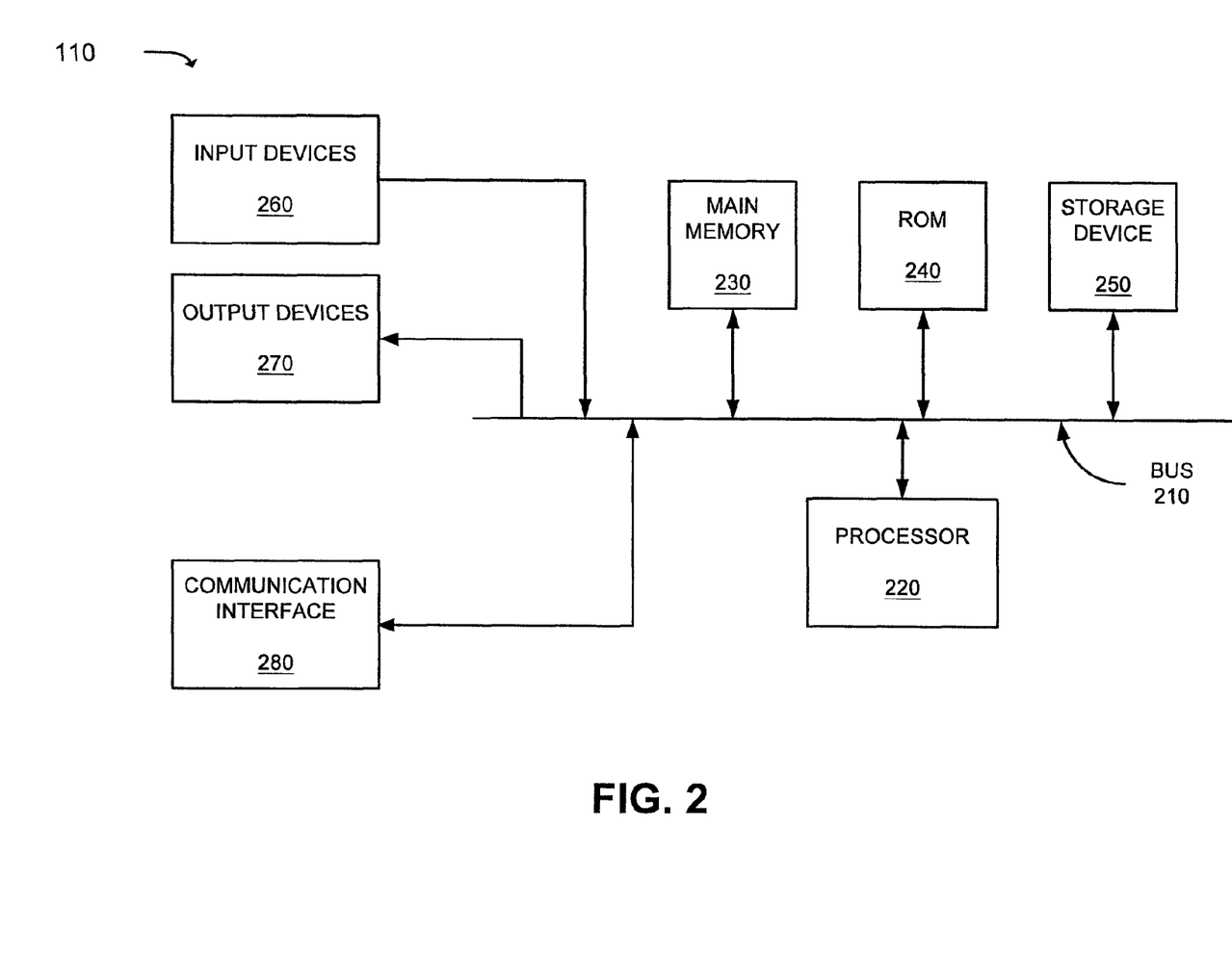
FIG. 2 is an exemplary diagram of a client of FIG. 1 in an implementation consistent with the present invention.

FIG. 2 is an exemplary diagram of a client 110 in an implementation consistent with the present invention. The client 110 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the client 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit a user to input information to the client 110, such as a keyboard, a mouse, a pen, voice recognition and/or biometric mechanisms, etc. The output devices 270 may include one or more conventional mechanisms that output information to the user, including a display, a printer, a speaker, etc. The communication interface 280 may include any transceiver-like mechanism that enables the client 110 to communicate with other devices and/or systems. For example, the communication interface 280 may include mechanisms for communicating with another device or system via a network, such as network 140.

As will be described in detail below, the clients 110, consistent with the present invention, perform certain searching-related operations. The clients 110 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Computer-Readable Medium

Figure 3:
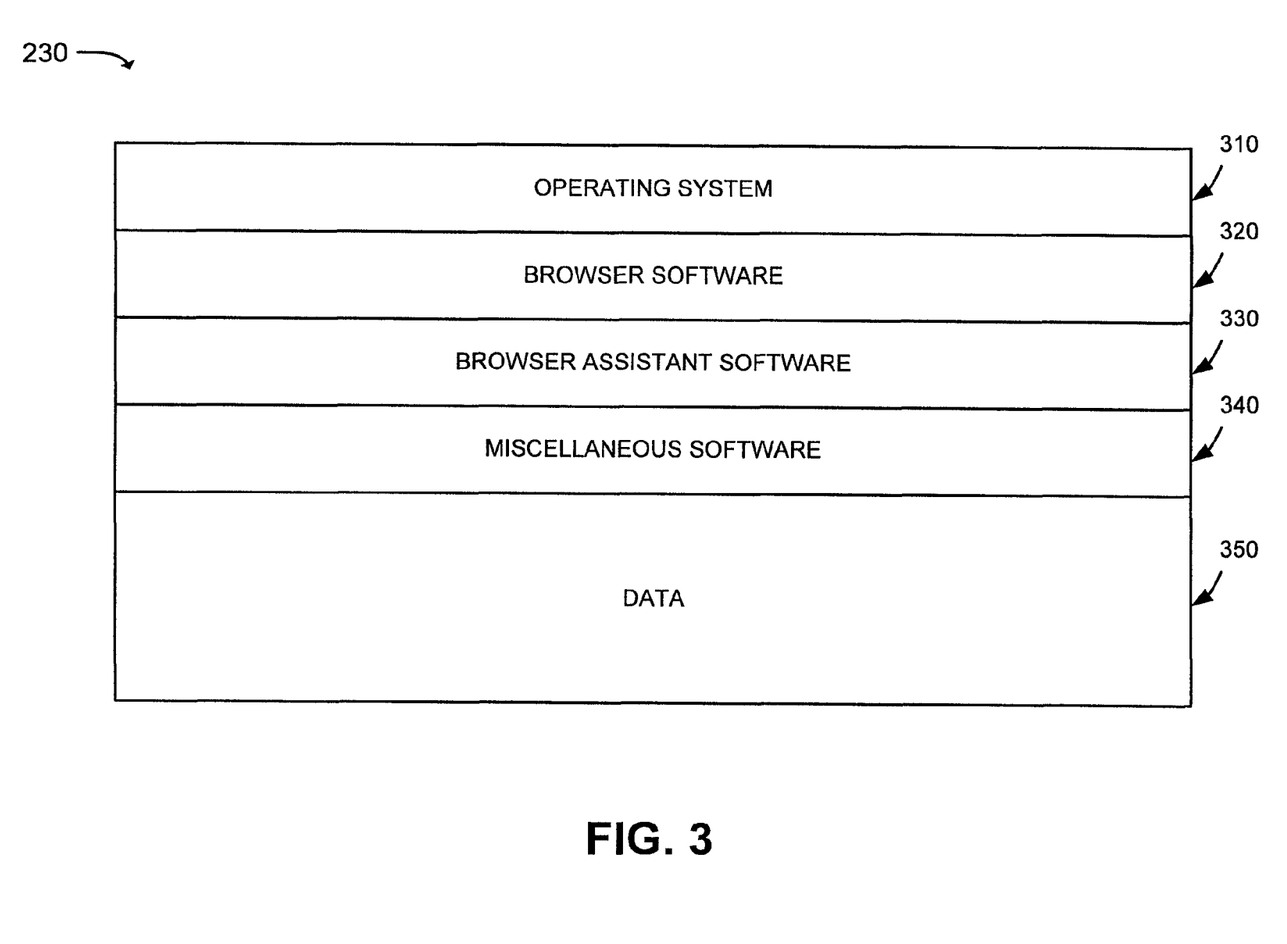
FIG. 3 is a diagram of an exemplary computer-readable medium used by the clients of FIG. 1 according to an implementation consistent with the present invention.

FIG. 3 is a diagram of an exemplary computer-readable medium used by the clients 110 according to an implementation consistent with the present invention. In this implementation, the computer-readable medium includes memory 230. The memory 230 may include an operating system 310, browser software 320, browser assistant software 330, miscellaneous other software 340, and miscellaneous data 350.

The operating system 310 may include conventional operating system software, such as the Windows, Unix, or Linux operating systems. The browser software 320 may include conventional web browser software, such as the Microsoft Internet Explorer or Netscape Navigator browsers.

The browser assistant software 330 may include a plug-in, an applet, a dynamic link library (DLL), or a similar executable object or process. The client 110 may obtain the plug-in from the server 120 or from a third party, such as a third party server, disk, tape, network, CD-ROM, etc. Alternatively, the plug-in may be pre-installed on the client 110.

In another implementation consistent with the present invention, the browser assistant 330 is part of the browser 320. In this implementation, the browser 320 performs the functions of the browser assistant 330. In yet another implementation, the browser assistant 330 is a process separate from and runs concurrently with the browser 320. In this implementation, the browser assistant 330 may interface between the browser 320 and the network 140.

The browser assistant 330 may be automatically activated upon initiation of the browser 320. Alternatively, the browser assistant 330 may be activated when instructed by a user. In either case, the browser assistant 330 may take the form of a graphical user interface, such as a tool bar, software button, or menu, that provides an extension to the browser 320.

Figure 4:
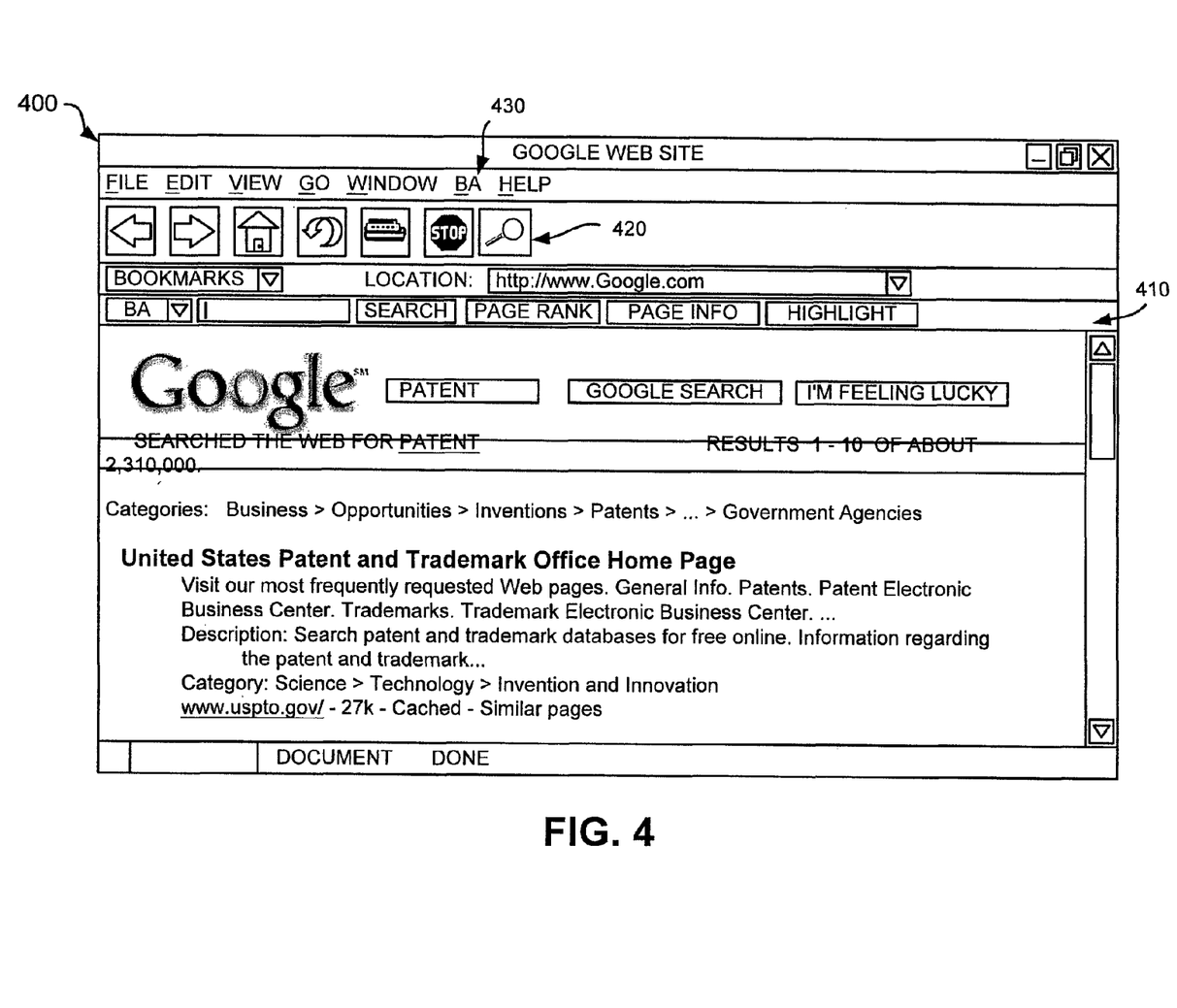
FIG. 4 is an exemplary diagram of a graphical user interface that includes the browser assistant of FIG. 3 according to an implementation consistent with the present invention.

FIG. 4 is an exemplary diagram of a graphical user interface 400 that includes a browser assistant (BA) 330 according to an implementation consistent with the present invention. The graphical user interface 400 illustrated in FIG. 4 shows three forms of the browser assistant 330: a tool bar 410, a software button 420, and a menu 430. The browser assistant 330 may take other forms.

The tool bar 410 includes software buttons and/or menus selectable by a user to initiate different operations by the browser assistant 330. In this case, a user may activate a function of the browser assistant 330 by selecting one of the software buttons and/or menus. The software button 420 may be selectable by a user to initiate the browser assistant 330 functionality. In this case, a user may activate a function of the browser assistant 330 by selecting the button using, for example, a mouse. The menu 430 may provide a list of functions that the browser assistant 330 is capable of performing. A user may select from the list to activate the browser assistant 330 and instruct the browser assistant 330 to perform the desired function.

As described in more detail below, the browser assistant 330 may perform many searching-related functions to enhance a user's search experience. The browser assistant 330 may attach to the browser 320 to provide additional functionality to the user.

Returning to FIG. 3, the miscellaneous other software 340 and miscellaneous data 350 may include programs and data used by the client 110 to perform searching-related and non-searching-related operations.

Exemplary Server Architecture

Figure 5:
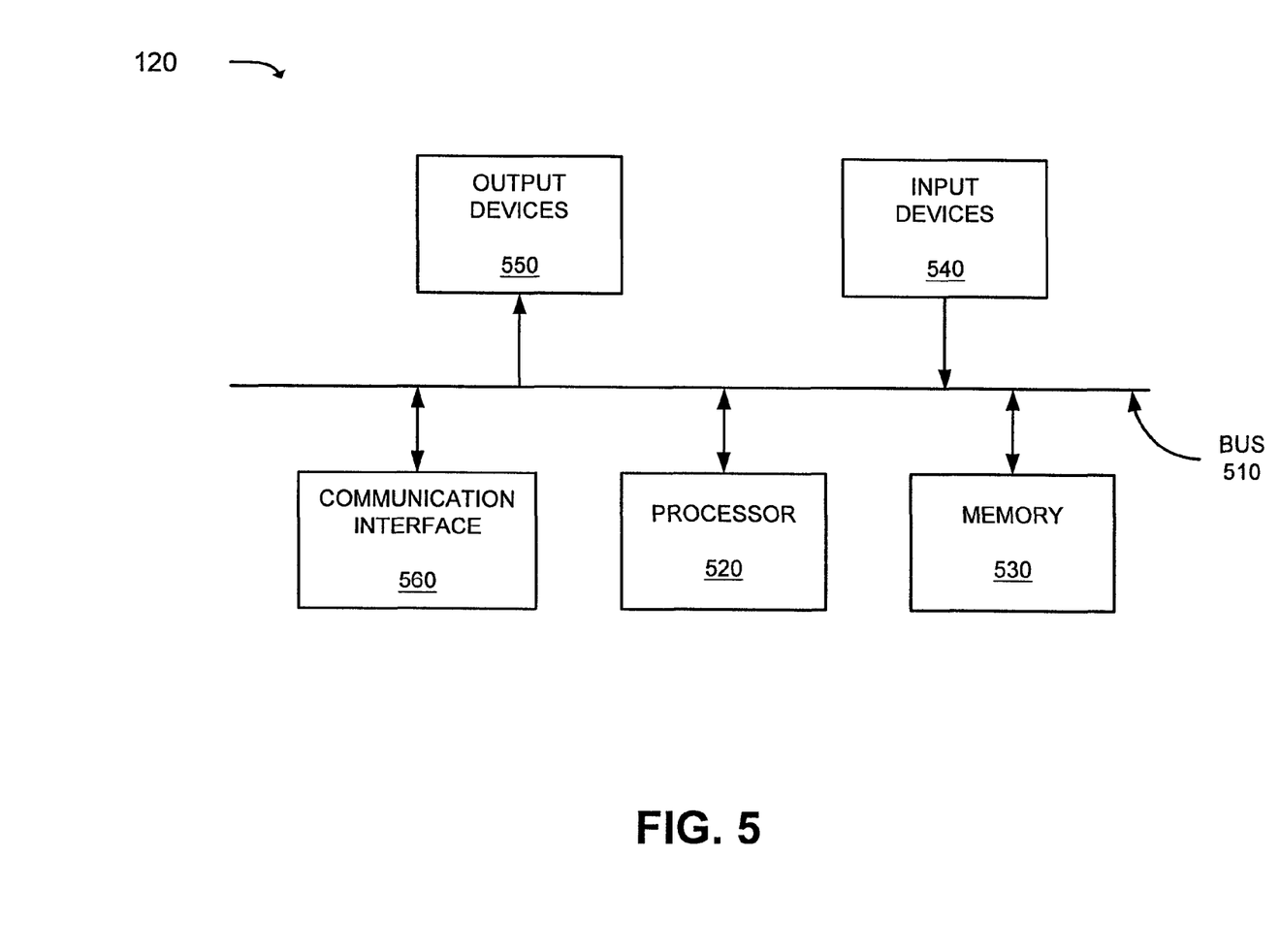
FIG. 5 is an exemplary diagram of a server of FIG. 1 according to an implementation consistent with the present invention.

FIG. 5 is an exemplary diagram of the server 120 according to an implementation consistent with the present invention. The servers 130 may be similarly configured.

The server 120 may include a bus 510, a processor 520, a memory 530, one or more input devices 540, one or more output devices 550, and a communication interface 560. The bus 510 permits communication among the components of the server 120. The processor 520 may include any type of conventional processor or microprocessor that interprets and executes instructions. The memory 530 may include a RAM or another type of dynamic storage device that stores information and instructions for execution by the processor 520; a ROM or another type of static storage device that stores static information and instructions for use by the processor 520; and/or some other type of magnetic or optical recording medium and its corresponding drive.

The input devices 540 may include one or more conventional mechanisms that permit an operator to input information into the server 120, such as a keyboard, mouse, pen, etc. The output devices 550 may include one or more conventional mechanisms that output information to the operator, including a display, a printer, a speaker, etc. The communication interface 560 may include any transceiver-like mechanism that enables the server 120 to communicate with other devices and systems via a network, such as the network 140.

As will be described in detail below, the server 120, consistent with the present invention, performs certain searching-related operations. The server 120 may perform these operations in response to processor 520 executing software instructions contained in a computer-readable medium, such as memory 530. The software instructions may be read into memory 530 from another computer-readable medium or from another device via the communication interface 560. The software instructions contained in memory 530 causes processor 520 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Processing for in-Context Searching Using Browser Assistant

Figure 6:
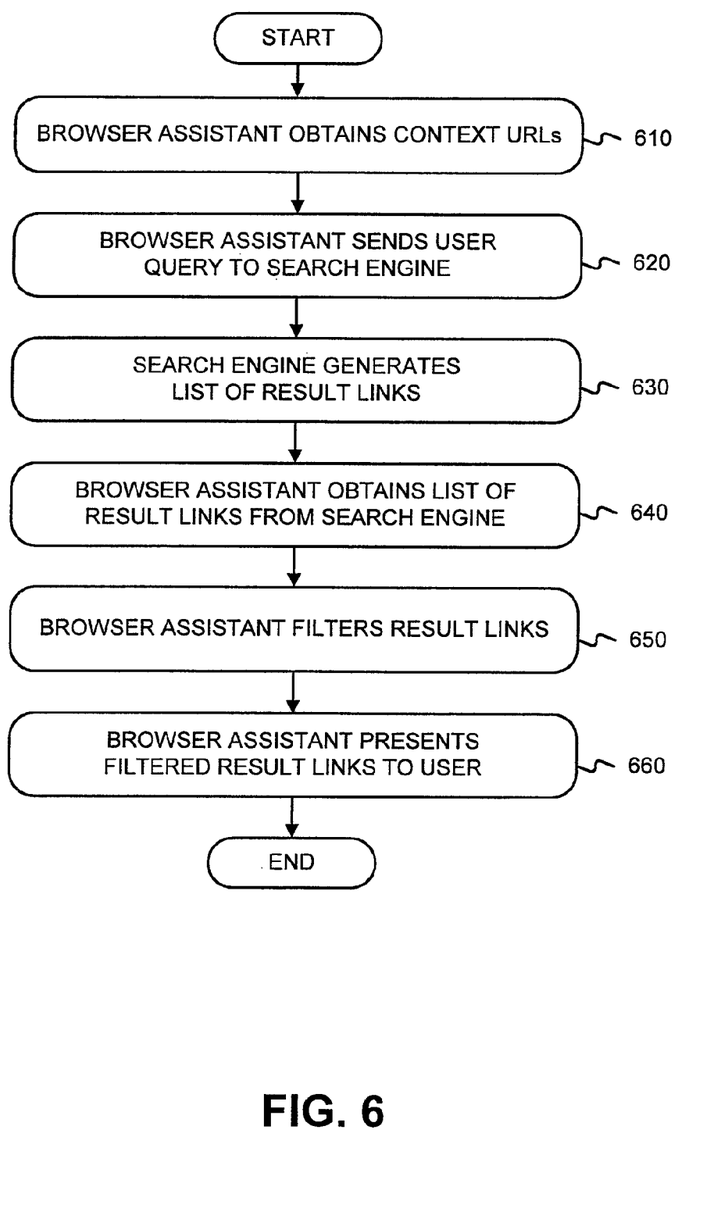
FIG. 6 is a flowchart of exemplary processing for performing in-context searching in accordance with an implementation consistent with the present invention.

FIG. 6 is a flowchart of exemplary processing for performing in-context searching in accordance with an implementation consistent with the present invention. Processing may begin with a user activating web browser software, such as browser 320 (FIG. 3), and possibly browser assistant software, such as the browser assistant 330, on a client, such as client 110 (FIG. 1). The user may then provide an address, such as a URL, of a document to the browser 320 or a query that the browser 320 or browser assistant 330 may use to obtain one or more addresses of (or links to) documents using a search engine, such as the search engine 125 maintained by the server 120. The user may then use the browser 320 to browse the network 140 in a conventional manner.

The browser assistant 330 may obtain a set of context addresses, such as URLs [act 610]. The browser assistant 330 may use different techniques to identify URLs for the set of context URLs. Some of these techniques may occur while the user browses the network and other techniques may occur at other times. According to one technique, the browser assistant 330 may use the URL of the document currently displayed by the browser 320 as the set of context URLs.

According to another technique, the browser assistant 330 may identify the URLs for the set of context URLs using a favorites list. To support a favorites list, the browser assistant 330 may provide the user with three interactive software buttons: add-to-favorites-list; remove-from-favorites-list; and search-with-favorites-list. While browsing, the user can add the URL of the document currently displayed by the browser 320 to the favorites list by selecting the add-to-favorites-list button. The browser assistant 330 may display the favorites list when instructed by the user. The user may remove URLs from the favorites list by selecting or highlighting them and selecting the remove-from-favorites-list button. The user may then search using the favorites list by selecting the search-with-favorites-list button.

According to a further technique, the browser assistant 330 may identify the URLs or categories of URLs for the set of context URLs using a preferences list (i.e., a list of URLs specific to a particular information need). After the information need is satisfied, the user may delete the preferences list or retain it with an appropriate label for future use. To support a preferences list, the browser assistant 330 may provide the user with four interactive software buttons: add-to-positive-preferences-list; add-to-negative-preferences-list; remove-from-preferences-list; and search-with-preferences-list.

To add a URL, the user may select the add-to-positive-preferences-list or add-to-negative-preferences-list buttons to add the URL of the document currently displayed by the browser 320 to the preferences list. The add-to-positive-preferences-list button may add URLs to the preferences list that are on-topic to the information need. The add-to-negative-preferences-list button may add URLs to the preferences list that are off-topic to the information need. The browser assistant 330 may use the on-topic and off-topic URLs when analyzing URLs returned as a result of a search. The browser assistant 330 may display the preferences list when instructed by the user. The user may remove URLs from the preferences list by selecting or highlighting them and selecting the remove-from-preferences-list button. The user may then search using the preferences list by selecting the search-with-preferences-list button.

To add a category, the user may instruct the browser 320 or browser assistant 330 to display a hierarchical directory of categories, such as the open directories found at www.dmoz.org or directory.google.com or a similar directory possibly maintained by the server 120 or one of the servers 130. To view a directory, the user may provide the address of the directory to the browser 320 or browser assistant 330 or select an additional interactive software button (e.g., add-category button) provided by the browser assistant 330.

The browser assistant 330 may recognize the address given by the user as a URL for a directory or detect selection of the add-category button. The browser assistant 330 may then display the hierarchical directory to the user. In an implementation consistent with the present invention, the browser assistant 330 may modify the hierarchical directory display to include selection boxes to facilitate the selection of one or more categories and/or subcategories by the user.

The user may select one or more of the categories or subcategories in the hierarchical directory and then select the add-to-positive-preferences-list or add-to-negative-preferences-list button. The browser assistant 330 may then recognize, using conventional techniques, the category or subcategory selected by the user. For the category or subcategory selected, the browser assistant 330 may obtain a list of URLs. To do this, the browser assistant 330 may communicate with the server maintaining the directory or may record this information itself. These URLs may then be added to the set of context URLs.

According to another technique, the browser assistant 330 may obtain the URLs for the set of context URLs from a server, such as server 130. For example, an author of a document stored by the server 130 may provide (e.g., hardcode) a list of URLs with the document. When the user performs a search or otherwise indicates while viewing the document, the server 130 may provide the list of URLs to the browser assistant 330. The browser assistant 330 may then add the URLs to the set of context URLs.

According to yet another technique, the browser assistant 330 may identify the URLs for the set of context URLs using a combination of the above techniques.

Thereafter, when the user desires to perform an in-context search, the user may enter one or more terms of a query. The browser assistant 330 may generate a request to query a search engine, such as the search engine 125 maintained by the server 120, using the terms entered by the user. The browser assistant 330 may then send the query request to the search engine 125 [act 620]. In response to the request, the search engine 125 may generate data that contains the search results and send the search results to the browser assistant 330 [act 630]. In an implementation consistent with the present invention, the search engine 125 provides the search results as a HyperText Markup Language (HTML) document, similar to search results provided by conventional search engines. Alternatively, the search engine 125 may provide the search results according to a protocol agreed upon by the search engine 125 and the browser assistant 330.

In an implementation consistent with the present invention, the search results include references (e.g., links) to documents (e.g., web pages) and possibly a textual description of the links. In another implementation, the search results include references (e.g., links) to directory nodes within a hierarchical directory and possibly textual descriptions for the directory nodes. In other implementations, the search results include a combination of these links.

The browser assistant 330 receives the list of result links from the search engine 125 [act 640]. If the list of result links takes the form of an HTML document, then the browser assistant 330 may parse the document to determine the links that are search results.

If a context set of URLs has been specified, as described above, the browser assistant 330 may filter the result links and discard all links that are not related to one or more of the set of context URLs [act 650]. In an implementation consistent with the present invention, the browser assistant 330 performs the filtering itself. The browser assistant 330 may consider two links related if they are on the same host. In this case, the browser assistant 330 may determine relatedness by comparing URLs in the context set with the URLs in the result links. Alternatively, the browser assistant 330 may test for relatedness by comparing the text of documents corresponding to the URLs in the context set with significant terms in documents corresponding to the result links. In this case, the browser assistant 330 may maintain a representation of the text of documents corresponding to all of the URLs in the context set and may receive significant terms for documents corresponding to the result links from the search engine 125 or another server.

The browser assistant 330 may use other techniques to determine if there is a related link (i.e., URL) in the context set. According to one technique, the browser assistant 330 considers two links related if they are on the same topic from a predetermined set of topics, as determined by conventional topic classifiers (i.e., classification-based similarity). Conventional information retrieval systems permit the classifications of documents, such as web pages, into sets of topics. D. Koller et al., "Hierarchically Classifying Documents Using Very Few Words," International Conference on Machine Learning, 1997, pp. 170-178, and D. Lewis, "Evaluating and Optimizing Autonomous Text Classification Systems," SIGIR 95: Proceedings of the Eighteenth Annual International ACM-SIGIR Conference on Research and Development in Information Retrieval, July 1995, pp. 246-254, describe two possible conventional classification techniques.

According to another technique, the browser assistant 330 considers two links as related if an analysis of user access patterns shows that accesses of the documents relating to the two links by users on the web are highly correlated (i.e., access-based similarity). In this case, the browser assistant 330 may maintain or obtain, for each link in the search engine index; a list of users who accessed the link.

According to yet another technique, the browser assistant 330 considers two links as related if a comparison of the full text of the documents relating to the two links shows a similarity (i.e., text-based similarity). The browser assistant 330 may use a conventional information retrieval process that determines the textual similarity between two documents. In this case, the browser assistant 330 may maintain or obtain the text of each document in the network in a convenient form (e.g., as a vector of terms and weights).

According to a further technique, the browser assistant 330 considers two links as related if an analysis of the linkage in the web surrounding the pair of links shows evidence of their relatedness (i.e., link-based similarity). In other words, two links may be considered related if one or more documents contain both of the links. In this case, the related-links filter may use a conventional analysis process, such as the one described in J. Dean et al., "Finding Related Web Pages in the World Wide Web," Eighth International World Wide Web Conference, May 1999, pp. 389-401.

According to another technique, the browser assistant 330 may determine link relatedness using a combination of the above techniques. For example, a score may be calculated for each of the above techniques and the scores may be combined in some manner to achieve a score for a pair of links. This score may be used in determining the relatedness of the links.

The above techniques may be combined in other ways. For example, the link-based similarity and text-based similarity may be combined to determine relatedness. In this case, for each co-citing document (i.e., a document that contains references to both of the links being considered), the keywords around the references in the co-citing document may be considered to weight (i.e., downgrade or upgrade) the relatedness score. For example, suppose an individual's homepage describes the individual's fascination with web design and the country of Java. Suppose further that the homepage contains citations to a Java (computer programming language) document and a Java (country) document. Under strictly link-based similarity, the pair of documents would be considered related because they are both cited by the same document. Under the combined approach, however, the words around the Java programming language and Java country citations would be considered and would likely lead to the conclusion that the documents are unrelated. As a result, the relatedness determination would be downgraded for this pair of documents.

The above techniques may be combined in yet other ways. For example, the link-based similarity and classification-based similarity may be combined to determine relatedness. In this case, for each co-citing document, the text of the citations corresponding to a given pair of links may be classified using a conventional classification process. Then, the relatedness score may be weighted (i.e., downgraded or upgraded) based on the similarity of the classifications of the text of the citations.

In another implementation consistent with the present invention, the browser assistant 330 performs the above filtering with the aid of a server, such as the server 130. In this implementation, the browser assistant 330 provides the server 130 with the result links and the set of context URLs. The server 130 may then filter the result links, using, for example, a related-links filter. The related-links filter may include software and/or hardware that filters the result links, possibly using one of the techniques described above, to remove links that are not related to URLs in the context set. The server 130 may then send the filtered result links to the browser assistant 330.

Once the filtering has been performed either by the browser assistant 330 or another device, such as the server 130, the browser assistant 330 presents the filtered result links to the user [act 660]. For example, the browser assistant 330 may present the filtered result links as a web page in a browser window. Alternatively, the browser assistant 330 may present the filtered result links as a list of selectable items within a user interface of the browser assistant 330. In one instance, the user interface of the browser assistant 330 may include a pull-down or pop-up menu. In another instance, the user interface may include a side-bar or a scrolling list.

The browser assistant 330 may also present links related to the links in the filtered result links, either in conjunction to or separately from the filtered result links. In this case, the browser assistant 330 may query a server, such as the server 130, that includes a related-links finder that identifies related links using one or more techniques similar to the technique(s) used by the related-links filter, as described above. The browser assistant 330 may send a query to the server 130 for each link individually or for all links collectively. The server 130 may then identify related links and return them to the browser assistant 330. Alternatively, the browser assistant 330 may identify the related links itself.

If the search engine 125 implements a directory hierarchy, the results of a search usually consist of a list of top ranked directory hierarchy nodes. In this case, the browser assistant 330 may download the links corresponding to the top ranked directory hierarchy nodes and display them instead of or in addition to the text of the top ranked directory hierarchy nodes.

Once the filtered result links and the related links, if any, are identified, the browser assistant 330 may rank them in some manner, such as by assigning scores to the links or by alphabetizing them.

To illustrate the above processing, suppose that a user desires to find documents directed to the country of Java. First suppose that the user simply entered "Java" into a web browser. In this case, the user might be presented with links for documents directed to the Java computer programming language. FIG. 7A illustrates example links with which the user might be presented. As shown in FIG. 7A, all of the links are directed to the Java programming language and not the country of Java.

Figure 7B:
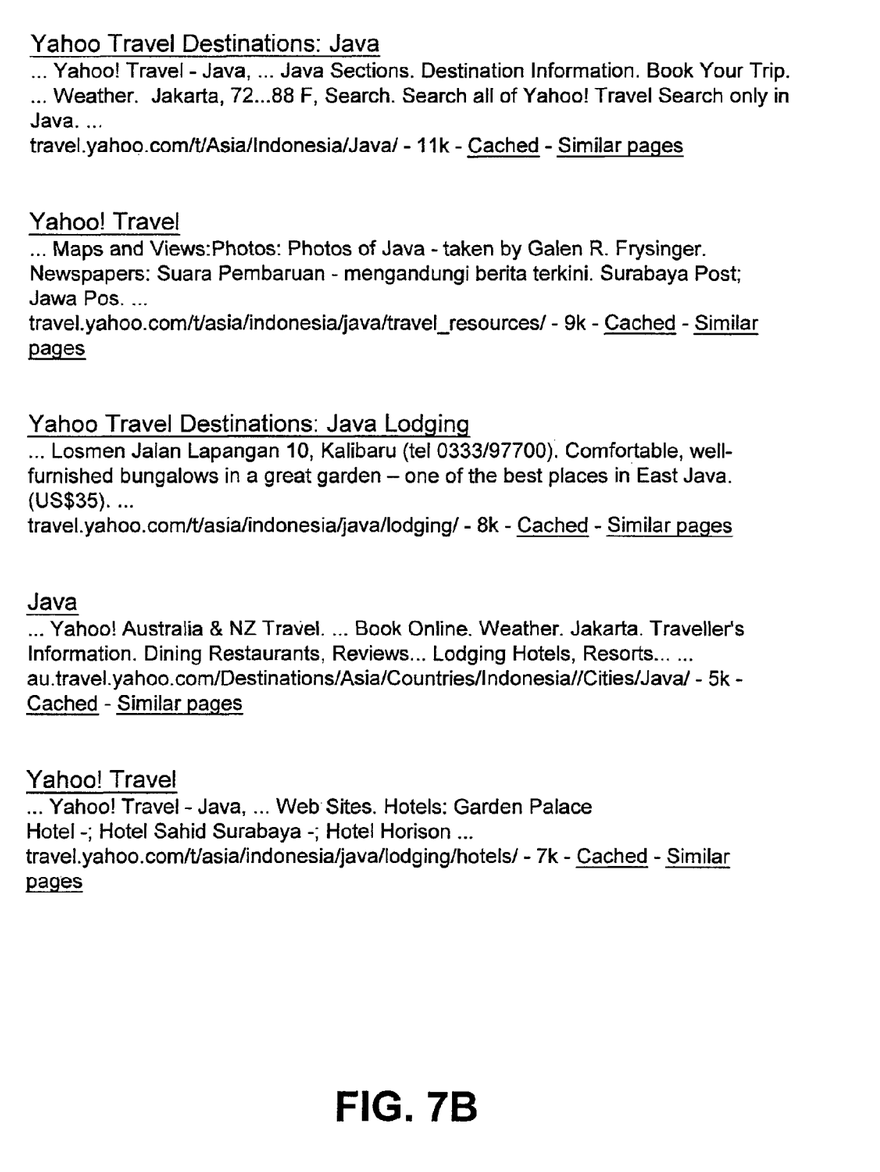
FIG. 7B illustrates example links with which the user might be presented.

Now suppose that the user used in-context searching and that the list of context URLs included a single link to travel.yahoo.com. In this case, the user might be presented with links for documents directed to the country of Java. FIG. 7B illustrates example links with which the user might be presented. As shown in FIG. 7B, all of the links are directed to the country of Java, as the user desired.

Exemplary Network without Browser Assistant

Figure 8:
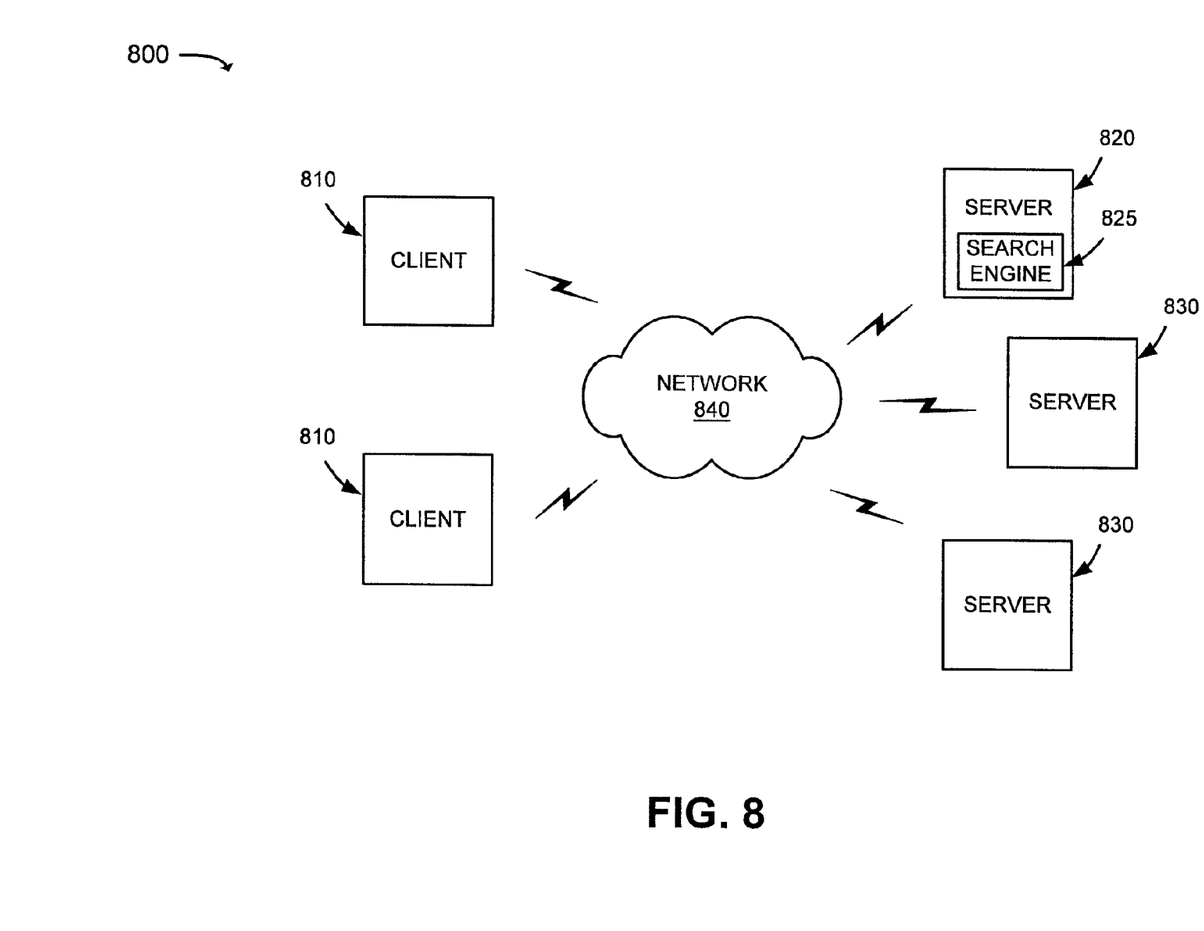
FIG. 8 is a diagram of another exemplary network in which systems and methods consistent with the present invention may be implemented.

FIG. 8 is an exemplary diagram of an alternate network 800 in which systems and methods consistent with the present invention may be implemented. The network 800 may include multiple clients 810 connected to multiple servers 820-830 via a network 840. The network 840 may include a LAN, a WAN, a telephone network, such as the PSTN, an intranet, the Internet, a similar or dissimilar network, or a combination of networks. The clients 810 and servers 820-830 may connect to the network 840 via wired, wireless, or optical connections. Two clients 810 and three servers 820-830 have been illustrated as connected to network 840 for simplicity. In practice, there may be more or less clients and servers. Also, in some instances, a client may perform the functions of a server and a server may perform the functions of a client.

The clients 810 may include devices, such as wireless telephones, personal computers, PDAs, lap tops, etc., threads or processes running on these devices, and/or objects executable by these devices. The clients 810 may be configured similar to the clients 110 in FIG. 1. Unlike the clients 110, however, the clients 810 do not include browser assistant software.

The servers 820-830 may include server devices, threads, and/or objects that operate upon, search, or maintain documents in a manner consistent with the present invention. The server 820 may include an enhanced search engine 825 and may be configured similar to the server 120 in FIG. 1. The servers 830 may also be configured similar to the servers 130 in FIG. 1.

Exemplary Processing for in-Context Searching without Using Browser Assistant

Figure 9:
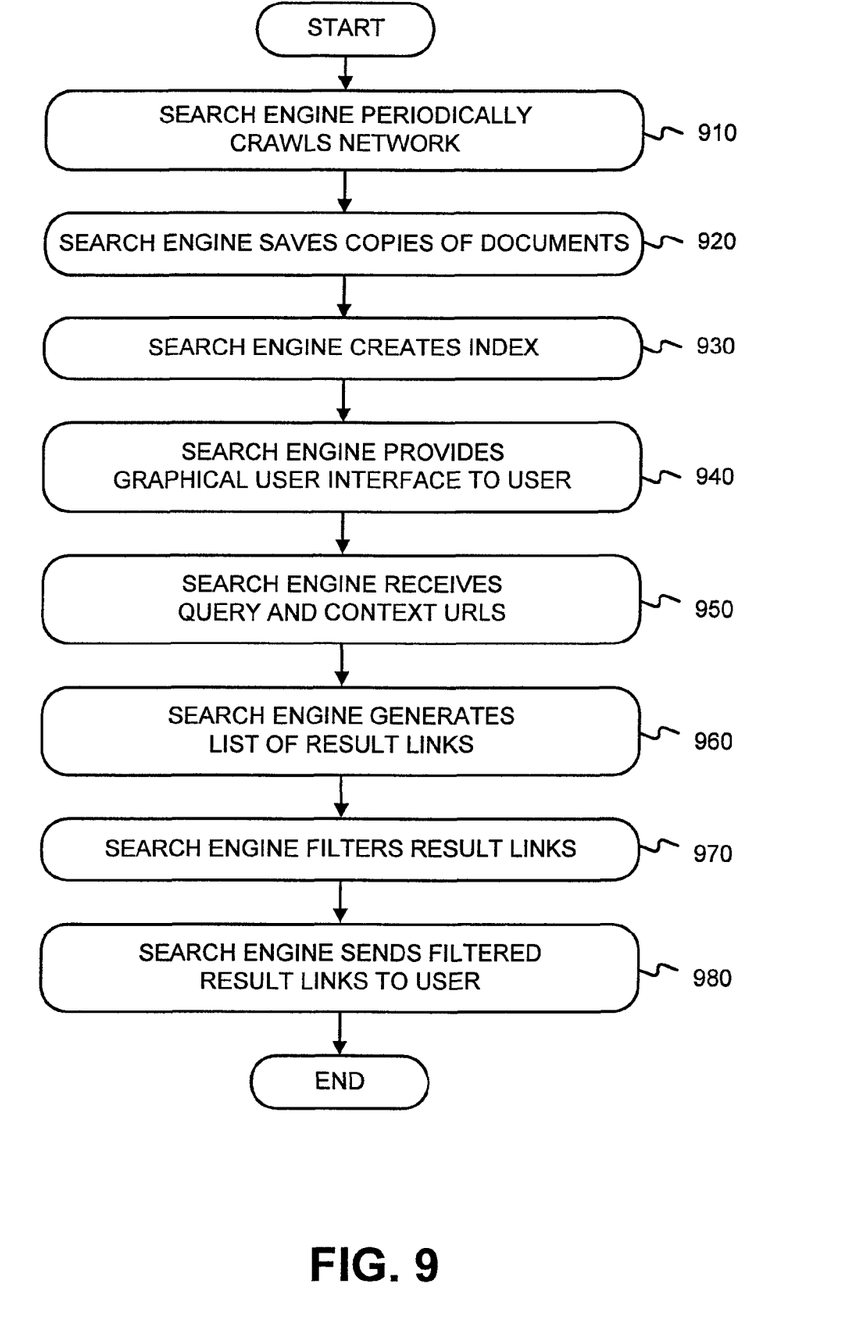
FIG. 9 is a flowchart of exemplary processing for performing in-context searching in accordance with an alternate implementation consistent with the present invention.

In an alternate implementation consistent with the present invention, an enhanced search engine, such as the search engine 825, may perform the result link filtering. FIG. 9 is a flowchart of exemplary processing for performing in-context searching in accordance with this alternate implementation. Processing may begin with a search engine, such as the enhanced search engine 825 on the server 820, periodically crawling the network 840 [act 910]. The search engine 825 may use a spider (i.e., a program that crawls a network to locate publicly accessible resources, such as web pages or other documents) to locate documents on the network 840. For each document located, the search engine 825 may save a copy of it [act 920]. The search engine 825 may also create an index based on the located documents [act 930].

When a user decides to perform a search of the network 840, the user may activate a web browser, such as the browser 320. The user may then use the browser 320 to access a search engine, such as the search engine 825, or a web directory. Assuming the user desires to use the search engine 825, the search engine 825 may provide a graphical user interface to the user via the browser 320 [act 940].

Figure 10:
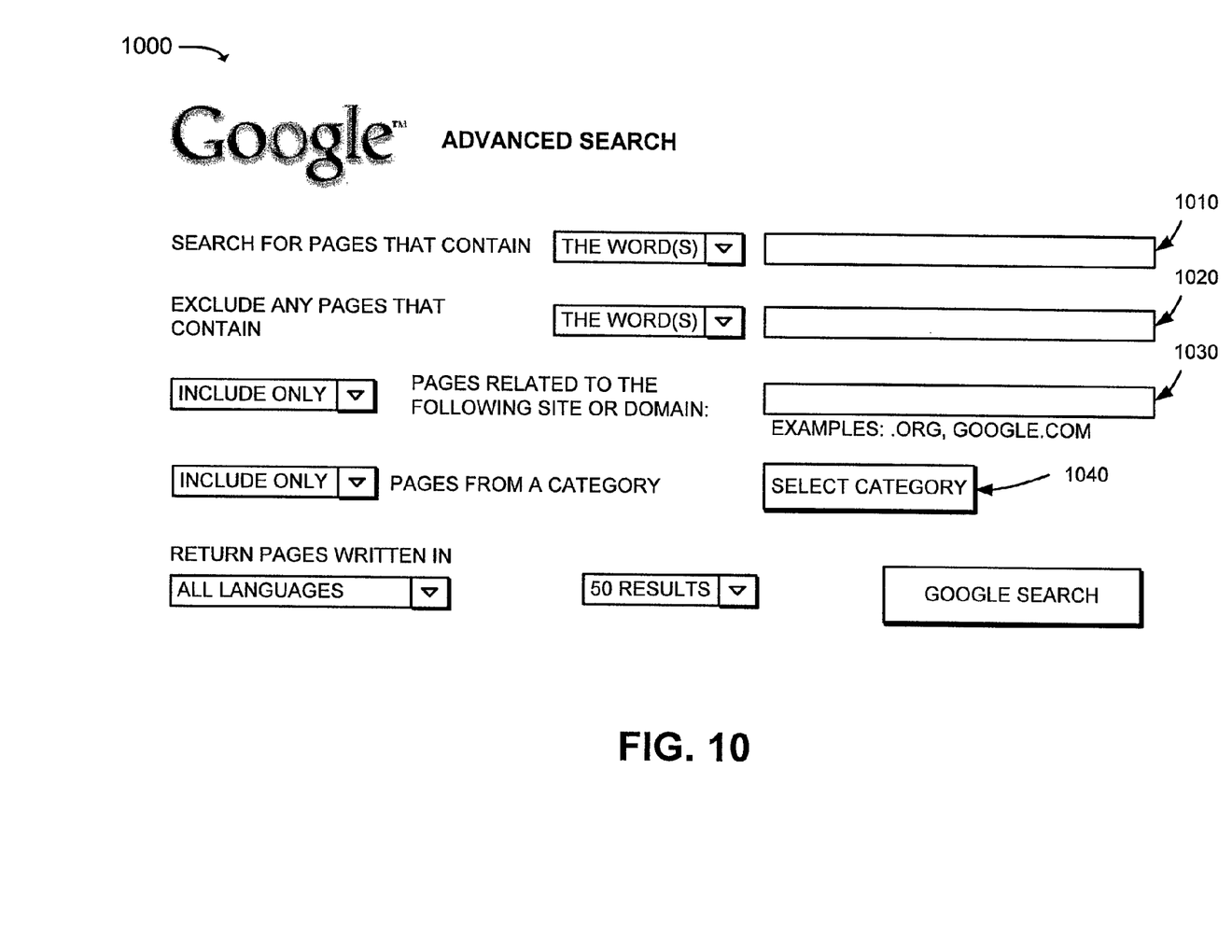
FIG. 10 is an exemplary diagram of a graphical user interface that the search engine of FIG. 8 may provide in accordance with an implementation consistent with the present invention.

FIG. 10 is an exemplary diagram of a graphical user interface (GUI) 1000 that the search engine 825 may provide in accordance with an implementation consistent with the present invention. The GUI 1000 may prompt the user to enter one or more search terms to include 1010 or exclude 1020 in the search results. The GUI 1000 may also prompt the user to provide a URL 1030 or category 1040 for the context set of URLs 1030. The category may correspond to categories within a hierarchical directory, such as an open directory, maintained by the search engine 825 or by another device or server. For example, the search engine 825 may maintain a hierarchical directory based on its periodic crawling of the network 840. For each category in the hierarchical directory, the search engine 825 may record a list of URLs and other information that correspond to that category. The search engine 825 may present a selectable list of categories to the user.

Returning to FIG. 9, the search engine 825 may receive the search terms and context information, such as URL(s) and/or category selection(s), from the user via the browser 320 [act 950]. Instead of requiring the user to enter the URL(s) and/or category selection(s), the browser 320 may automatically provide this information. In this case, the user may establish the information at some earlier time for recordation by the browser 320. For example, the browser 320 may provide a favorites or preferences list of the user.

In another implementation consistent with the present invention, the search engine 825 receives the search terms and context information from another server, such as server 830. In this implementation, the user may access a document on the server 130. Suppose, for example, that the document provides a search box, as known in the art (e.g., see www.washingtonpost.com for a document that provides a Google search box), that permits a user to enter one or more search terms and sends the search terms to the search engine 825. Suppose further that the author of the document has provided (e.g., hardcoded) a list of context URLs that may be used whenever a search is conducted from this document. Therefore, when the user conducts a search using the search box in the document, the server 130 may send the search terms and the context URLs to the search engine 825.

In response, the search engine 825 may generate data that contains the search results in a conventional manner [act 960]. As described above, the search results may include a list of references (or links) to documents (e.g., web pages) and possibly a textual description of the links, references (or links) to directory nodes within a hierarchical directory and possibly textual descriptions for the directory nodes, or a combination of these links.

The search engine 825 may then filter the list using one of the techniques described above [act 970]. For example, the search engine may use classification, access, text, or link-based filtering or a combination of these filtering techniques.

The search engine 825 may send the filtered result links to the browser 320 for presentation to the user [act 980].

The browser 320 may receive the list of result links from the search engine 825. If the list of result links takes the form of an HTML document, then the browser 320 may parse the document to determine the links that form the search results. The browser 320 may then present the result links to the user in a conventional manner.

While the foregoing acts have been described as being performed by the server 820, the acts may be performed by one of the servers 830 in other implementations consistent with the present invention.

CONCLUSION

Systems and methods consistent with the present invention permit a user to limit search results to a defined set of information, such as a context set of URLs. As a result, the present invention provides meaningful search results to the user.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts have been described with regard to FIGS. 6 and 9, the order of the acts may be modified in other implementations consistent with the present invention.

Also, two separate network configurations have been described with regard to FIGS. 1 and 8. Other configurations or a combination of configurations may occur in other implementations consistent with the present invention.

The scope of the invention is defined by the claims and their equivalents.

What is claimed is:

1. A computer-implemented method comprising:
   identifying, by a browser assistant, a set of one or more context uniform resource identifiers;
   receiving, by the browser assistant, a set of one or more referenced uniform resource identifiers that are referenced by a search results page provided by a search engine;
   for each referenced uniform resource identifier, determining, by the browser assistant, a relatedness score based on an extent to which the referenced uniform resource identifier is related to one or more of the context uniform resource identifiers;
   selecting, by the browser assistant, a subset of the referenced uniform resource identifiers for presentation based on the relatedness scores; and
   providing, by the browser assistant, the subset of the referenced uniform resource identifiers for presentation as a web page in a browser window.

2. The method of claim 1, the method further comprising:
   identifying, by the browser assistant, a particular uniform resource identifier associated with a current browsing session;
   identifying, by the browser assistant, one or more other uniform resource identifiers that are related to the particular uniform resource identifier associated with the current browsing session; and
   adding, by the browser assistant, the one or more other uniform resource identifiers to the set of one or more context uniform resource identifiers.

3. The method of claim 1, wherein the set of one or more context uniform resource identifiers includes uniform resource identifiers associated with one or more of a favorites list, a positive preference list, or a negative preference list.

4. The method of claim 1, the method further comprising:
receiving, by the browser assistant, a user request to modify the set of one or more context uniform resource identifiers; and
modifying, by the browser assistant, the set of one or more context uniform resource identifiers based on the received user request.

5. The method of claim 1, wherein the extent to which the reference uniform resource identifier is related to one or more of the context uniform resource identifiers is based on a combination of two or more factors.

6. The method of claim 5, wherein the two or more factors include a text-based similarity analysis and a non-text based similarity analysis.

7. The method of claim 6, wherein the non-text based similarity analysis includes a classification-based similarity analysis, an access-based similarity analysis, or a linked based similarity analysis.

8. A system comprising:
one or more processors and one or more computer storage media storing instructions that are operable, when executed by the one or more processors, to cause the one or more processors to perform operations comprising:
identifying, by a browser assistant, a set of one or more context uniform resource identifiers;
receiving, by the browser assistant, a set of one or more referenced uniform resource identifiers that are referenced by a search results page provided by a search engine;
for each referenced uniform resource identifier, determining, by the browser assistant, a relatedness score based on an extent to which the referenced uniform resource identifier is related to one or more of the context uniform resource identifiers;
selecting, by the browser assistant, a subset of the referenced uniform resource identifiers for presentation based on the relatedness scores; and
providing, by the browser assistant, the subset of the referenced uniform resource identifiers for presentation as a web page in a browser window.

9. The system of claim 8, the operations further comprising:
identifying, by the browser assistant, a particular uniform resource identifier associated with a current browsing session;
identifying, by the browser assistant, one or more other uniform resource identifiers that are related to the particular uniform resource identifier associated with the current browsing session; and
adding, by the browser assistant, the one or more other uniform resource identifiers to the set of one or more context uniform resource identifiers.

10. The system of claim 8, wherein the set of one or more context uniform resource identifiers includes uniform resource identifiers associated with one or more of a favorites list, a positive preference list, or a negative preference list.

11. The system of claim 8, the operations further comprising:
receiving, by the browser assistant, a user request to modify the set of one or more context uniform resource identifiers; and
modifying, by the browser assistant, the set of one or more context uniform resource identifiers based on the received user request.

12. The system of claim 8, wherein the extent to which the reference uniform resource identifier is related to one or more of the context uniform resource identifiers is based on a combination of two or more factors.

13. The system of claim 12, wherein the two or more factors include a text-based similarity analysis and a non-text based similarity analysis.

14. The system of claim 13, wherein the non-text based similarity analysis includes a classification-based similarity analysis, an access-based similarity analysis, or a linked based similarity analysis.

15. A non-transitory computer-readable medium having stored thereon instructions, which, when executed by one or more computers, cause the one or more computers to perform operations comprising:
identifying, by a browser assistant, a set of one or more context uniform resource identifiers;
receiving, by the browser assistant, a set of one or more referenced uniform resource identifiers that are referenced by a search results page provided by a search engine;
for each referenced uniform resource identifier, determining, by the browser assistant, a relatedness score based on an extent to which the referenced uniform resource identifier is related to one or more of the context uniform resource identifiers;
selecting, by the browser assistant, a subset of the referenced uniform resource identifiers for presentation based on the relatedness scores; and
providing, by the browser assistant, the subset of the referenced uniform resource identifiers for presentation as a web page in a browser window.

16. The computer-readable medium of claim 15, the operations further comprising:
identifying, by the browser assistant, a particular uniform resource identifier associated with a current browsing session;
identifying, by the browser assistant, one or more other uniform resource identifiers that are related to the particular uniform resource identifier associated with the current browsing session; and
adding, by the browser assistant, the one or more other uniform resource identifiers to the set of one or more context uniform resource identifiers.

17. The computer-readable medium of claim 15, wherein the set of one or more context uniform resource identifiers includes uniform resource identifiers associated with one or more of a favorites list, a positive preference list, or a negative preference list.

18. The computer-readable medium of claim 15, wherein the extent to which the reference uniform resource identifier is related to one or more of the context uniform resource identifiers is based on a combination of two or more factors.

19. The computer-readable medium of claim 18, wherein the two or more factors include a text-based similarity analysis and a non-text based similarity analysis.

20. The computer-readable medium of claim 19, wherein the non-text based similarity analysis includes a classification-based similarity analysis, an access-based similarity analysis, or a linked based similarity analysis.

* * * * *